Sept. 11, 1923.
A. L. McPHERSON
AUTOMOBILE SEAT
Filed Dec. 2, 1922
1,467,645
2 Sheets-Sheet 1
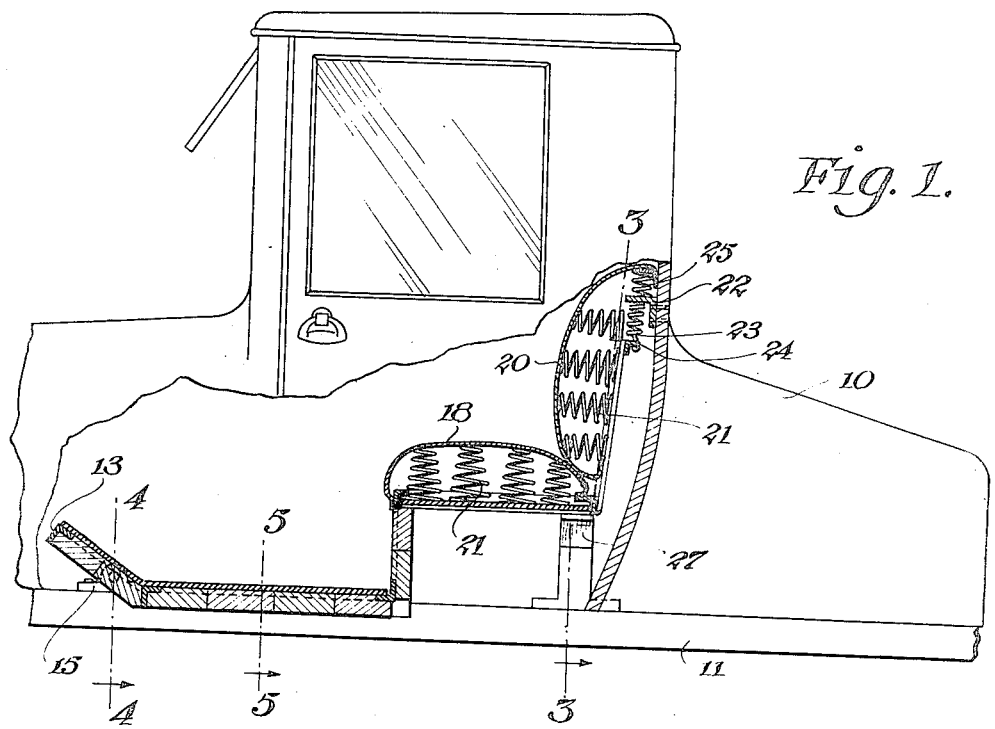
Fig. 1.
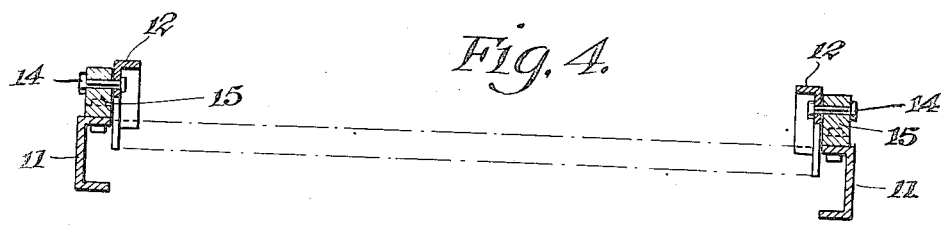
Fig. 4.
Fig. 5.
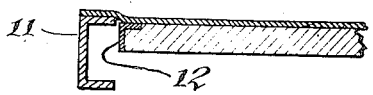
Inventor
Alonzo L. McPherson.
William C. Linton.
Attorney Sept. 11, 1923.

A. L. McPHERSON

AUTOMOBILE SEAT

Filed Dec. 2, 1922

Inventor
Alonzo L. McPherson.
William C. Linton,
Attorney

Patented Sept. 11, 1923.

1,467,645

UNITED STATES PATENT OFFICE.

ALONZO L. McPHERSON, OF AMESBURY, MASSACHUSETTS.

AUTOMOBILE SEAT.

Application filed December 2, 1922. Serial No. 604,620.

*To all whom it may concern:*

Be it known that ALONZO L. MCPHERSON, a citizen of the United States, residing at Amesbury, in the county of Essex, and State of Massachusetts, has invented certain new and useful Improvements in Automobile Seats, of which the following is a specification.

This invention relates to automobiles, and has special reference to an improved automobile seat.

In the usual construction of automobile seats, the seat frame forms a fixed part of the body of the machine, and on this frame are supported the seat and seat back, the seat being usually removable from the frame but, when in position, fitting such frame in a practically immovable manner. This construction, the seat being usually a spring seat, causes the body of the person occupying the seat to continually rise and fall while their feet commonly remain stationary on the floor. This tendency of position between the feet and the body induces the constant movement of the knee and hip joints and tends to fatigue the rider very quickly.

One important object of the present invention is to provide an improved construction of automobile having a seat arrangement wherein any movement of the person relative to the automobile chassis caused by inequalities in the road or pavement, will take place as a whole, the body maintaining its relation with the limbs.

A second important object of the invention is to provide an improved seat and floor arrangement for automobiles wherein movement of the seat caused by inequalities in the road will also cause corresponding movement of the floor thereby enabling a person to ride in ease and comfort and diminishing fatigue.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Fig. 1 is a side elevation of a portion of an automobile, the view being partly in section to disclose the improved seat arrangement in connection with such automobile.

Fig. 4 is a detail section on the line 4—4 of Fig. 1.

Fig. 5 is a detail section on the line 5—5 of Fig. 1.

Figure 2:
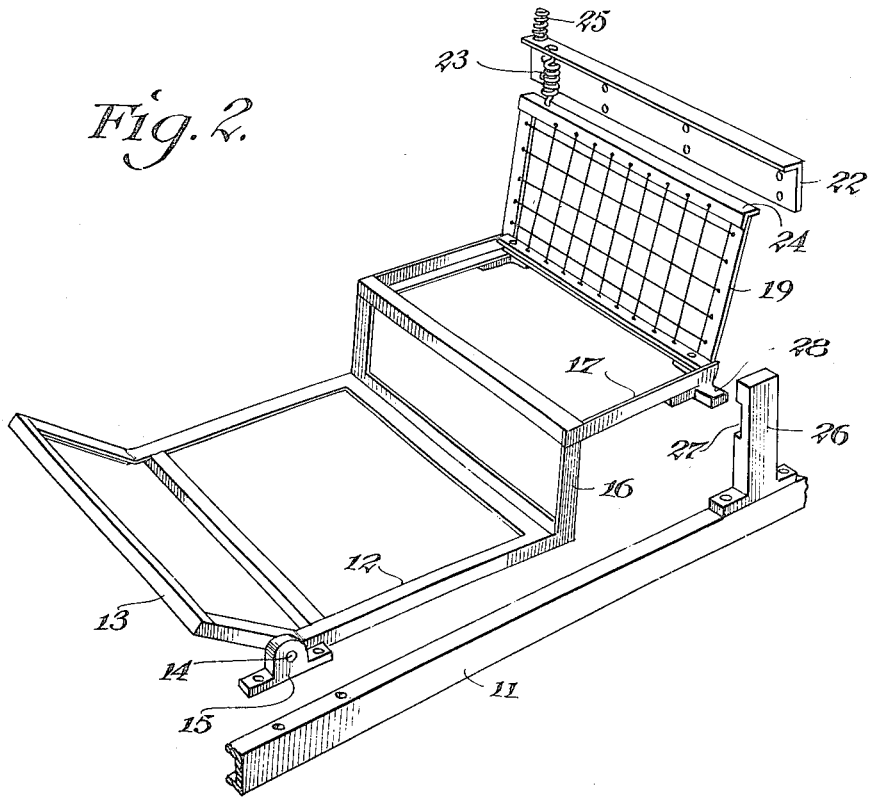
Fig. 2 is a detail perspective view showing certain of the parts particularly associated with the present invention.
Figure 3:
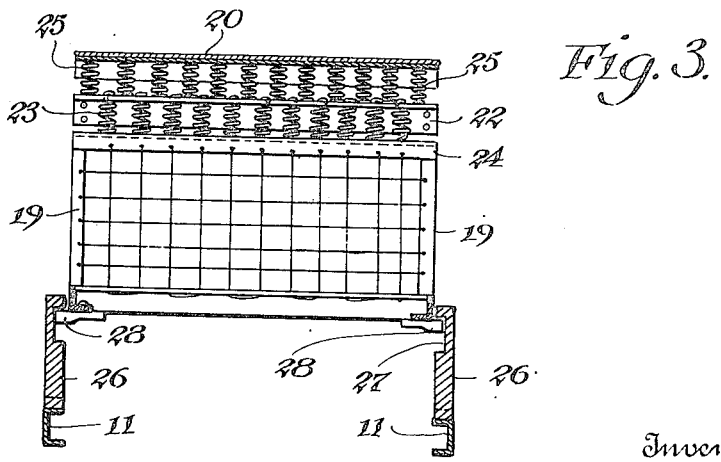
Fig. 3 is a detail section on the line 3—3 of Fig. 1.

In the embodiment of the invention herein disclosed, there is shown a portion of an automobile having a body 10, and the usual longitudinal frame members 11 forming part of the chassis. At 12 there is a rectangular floor frame of such size as to fit between the members 11, and having an upturned forward end 13 forming a frame for the foot board. This upturned forward end carries pivot pins 14 which are received in bearings 15 mounted on the frame members 11 opposite each other. At the rear of the frame 12 there is a seat frame consisting of an upstanding portion 16, and a horizontal portion 17 whereon rests the seat 18. At the rear of this horizontal portion is a back frame 19 extending upwardly and being slightly inclined to the rear so as to support the back 20 at a comfortable angle. Both the seat and back 20 are provided with the usual springs 21 supporting the covering material of the seat and back. Extending across the body 10 is a fixed cross bar 22 in the form of an angle iron, this cross bar thus making an elongated transversely disposed bracket, and depending from this bracket are a series of supporting springs 23, which have their lower ends secured as at 24, to the upper part of the back frame 10. The cover of the back 20 is carried up above this bracket 22, and is supported on springs 25 resting on said bracket. By means of this arrangement, the entire structure of the combined floor and seat frame is spring supported at the rear so that the rear portion may swing up and down about the pivot pins 14. Under these conditions a person occupying the seat will find that the knee and hip joints will have no tendency to flex as the machine runs over inequalities in the road, the body of the person and his legs moving as a unit. Supported on the members 11 adjacent the rear end of the frame 17 are guide members 26 having notches 27 wherein are received lugs 28 projecting laterally from the sides of the seat frame 17. Thus, the rear end of the combined floor and seat frame is guided between the members 26, while the lugs 28 and notches 27 serve to limit the relative movement between the combined seat and floor frame and the chassis of the automobile.

It will also be noted that the springs 25 serve to support the upper part of the seat back while allowing it to move with the balance on such seat back.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. The combination with the body of an automobile and a chassis therefor having longitudinal side frame members; of a substantially horizontal rectangular floor frame having its forward end pivotally connected to the side frame members, an upwardly and rearwardly extending seat frame carried by the rear end of said floor frame and having an upstanding back frame, a cross bar extending fixedly across the said body above the back frame, springs connecting said cross bar and back frame, a seat carried by the seat and back frames and having a back portion extending above said cross bar, and springs supported on the cross bar and supporting the upper end of the back portion of said seat.

2. The combination with an automobile chassis having a pair of longitudinal side frame members, of a flexibly supported floor and seat comprising a horizontal portion arranged between said side frame members, an upturned portion formed with the forward end of said horizontal portion, means for pivotally connecting said upturned portion to said frame members, an elevated portion providing the seat being formed with the rear end of said horizontal portion, means for connecting the upper end of said elevated portion with the automobile chassis, and means operatively connecting said elevated portion with said side frame members, whereby the swinging movement of said floor and seat will be limited.

3. The combination with an automobile chassis comprising a pair of side frame members and a cross bar arranged above said side frame members, a floor pivotally mounted upon said frame members, a seat connected to said floor having a back rest, springs connecting the upper end of the back rest of said seat with said cross bar, a back for said back rest and springs arranged between said back and the upper face of said cross bar.

ALONZO L. McPHERSON.